(12) United States Patent
Gamon et al.

(10) Patent No.: US 11,803,703 B2
(45) Date of Patent: Oct. 31, 2023

(54) COLLABORATIVE COMMUNICATION TRIAGE ASSISTANCE

(71) Applicant: Microsoft Technology Licensing, LLC, Redmond, WA (US)

(72) Inventors: Michael Gamon, Seattle, WA (US); Sujay Kumar Jauhar, Kirkland, WA (US); Bahareh Sarrafzadeh, Seattle, WA (US); Mark James Encarnacion, Bellevue, WA (US); Liye Fu, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/332,169

(22) Filed: May 27, 2021

(65) Prior Publication Data

US 2022/0382971 A1    Dec. 1, 2022

(51) Int. Cl.
*G06F 17/00* (2019.01)
*G06F 40/194* (2020.01)
*G06F 40/197* (2020.01)
*G06F 40/106* (2020.01)
*G06F 40/169* (2020.01)

(52) U.S. Cl.
CPC .......... *G06F 40/194* (2020.01); *G06F 40/106* (2020.01); *G06F 40/169* (2020.01); *G06F 40/197* (2020.01)

(58) Field of Classification Search
CPC .... G06F 40/194; G06F 40/169; G06F 40/197; G06F 40/106; G06F 16/3349; G06F 16/24535; G06F 16/907; G06F 16/9535

USPC ........................................................ 715/230
See application file for complete search history.

(56) References Cited

U.S. PATENT DOCUMENTS

| | | | |
|---|---|---|---|
| 2009/0319917 A1* | 12/2009 | Fuchs ..................... | H04M 3/56 715/753 |
| 2014/0280602 A1* | 9/2014 | Quatrano ................ | H04W 4/08 709/205 |
| 2016/0316059 A1* | 10/2016 | Nuta ........................ | G10L 15/26 |
| 2019/0102078 A1* | 4/2019 | Bhatt ...................... | G06F 40/30 |

(Continued)

OTHER PUBLICATIONS

Beck, E. E., "A Survey of Experiences of Collaborative Writing," Chapter 6, Computer Supported Collaborative Writing, 1993, pp. 88-112.

(Continued)

*Primary Examiner* — Jason T Edwards

(57) ABSTRACT

Systems, storage media and methods for providing information for user prioritization of tasks associated with collaboratively developed content are described. Some examples may include: receiving a conversation thread associated with collaboratively developed content, the conversation thread including a plurality of comments authored by multiple different authors, generating a predicted measure of completion for the received conversation thread, the predicted measure of completion being at least one of a predicted number of remaining actions until the received conversation thread is resolved or a predicted number of total actions for the conversation thread to be resolved and providing, for display at a user interface, the predicted measure of completion for the received conversation thread, the predicted measure of completion being associated with the conversation thread at the user interface.

20 Claims, 12 Drawing Sheets

(56) References Cited

U.S. PATENT DOCUMENTS

| | | | | |
|---|---|---|---|---|
| 2019/0304445 | A1* | 10/2019 | Nahamoo | G06F 9/5038 |
| 2021/0117506 | A1* | 4/2021 | Botea | G06F 40/35 |
| 2021/0160374 | A1* | 5/2021 | Richards | H04M 3/5237 |

OTHER PUBLICATIONS

Zhang, et al.,Modeling the Relationship between User Comments and Edits in Document Revision, "In Proceedings ofthe Conference on Empirical Methods in Natural Language Processing and the 9th International Joint Conference on Natural Language Processing (EMNLP-IJCNLP).Association for Computational Linguistics", Nov. 3, 2019, pp. 5002-5011.

Backstrom, et al., "Characterizing and Curating Conversation Threads: Expansion, Focus, Volume, Re-entry", In Proceedings of the sixth ACM international conference on Web search and data mining, Feb. 4, 2013, pp. 13-22.

Beck, E. E., "A Survey of Experiences of Collaborative Writing", In Computer Supported Collaborative Writing, 1993.

Casalnuovo, et al., "Developer onboarding in GitHub: The role of prior social links and language experience", In Proceedings of the10th Joint Meeting on Foundations of Software Engineering, Aug. 30, 2015, pp. 817-828.

Chang, et al., "ConvoKit: A Toolkit for the Analysis of Conversations", In Proceedings of the 21th Annual Meeting of the Special Interest Group on Discourse and Dialogue, Jul. 2020, 4 Pages.

D'Angelo, et al., "Spacetime Characterization of Real-Time Collaborative Editing", In Proceedings of the ACM on Human-Computer Interaction, Nov. 1, 2018, 19 Pages.

Danescu-Niculescu-Mizil, et al., "Echoes of power: Language effects and power differences in social interaction", In InProceedings of the 21st international conference on Worid Wide Web, Apr. 16, 2012, pp. 699-708.

Daxenberger, et al., "A Corpus-Based Study of Edit Categories in Featured and Non-Featured Wikipedia Articles", In Proceedings of COLING, Dec. 2012, pp. 711-726.

Daxenberger, Johannes, "The Writing Process in Online Mass Collaboration: NLP-Supported Approaches to Analyzing Collaborative Revision and User Interaction", In Thesis of University of Darmstadt, Dec. 8, 2016, 220 Pages.

Dhasade, et al., "Towards Prioritizing GitHub Issues", In Proceedings of the 13th Innovations in Software Engineering Conference on Formerly Known as India Software Engineering Conference, Feb. 27, 2020, 5 Pages.

Ede, et al., "Singular Textsplural Authors: Perspectives on Collaborative Writing", In Publication of Southern Illinois University Press, 1990.

Hertzum, et al., "Six Roles of Documents in Professionals' Work", In Proceedings of the Sixth European Conference on Computer Supported Cooperative Work, Sep. 12, 1999, pp. 41-42.

Im, et al., "Deliberation and Resolution on Wikipedia: A Case Study of Requests for Comments", In Proceedings of the ACM on Human-Computer Interaction, Nov. 1, 2018, 24 Pages.

Joulin, et al., "Bag of Tricks for Efficient Text Classification", In Journal of Computing Research Repository, Jul. 2016, 5 Pages.

Jurgens, et al., "Temporal Motifs Reveal the Dynamics of Editor Interactions in Wikipedia", In Proceedings of the Sixth International AAAI Conference on Weblogs and Social Media, May 20, 2012, pp. 162-169.

Kahneman, et al., "Intuitive Prediction: Biases and Corrective Procedures", In Decision Research Technical Report PTR-1042-77-6, Jun. 1977, 44 Pages.

Kalliamvakou, et al., "The promises and perils of mining github", In Proceedings of the 11th Working Conference on Mining Software Repositories, May 31, 2014, pp. 92-101.

Kavaler, et al., "Perceived language complexity in GitHub issue discussions and their effect on issue resolution", In 32nd IEEE/ACM International Conference on Automated Software Engineering, Oct. 1, 2017, 12 Pages.

Kavaler, et al., "Whom are you going to call? determinants of@-mentions in github discussions", In Journal of Empirical Software Engineering, vol. 24, Issue 6, Dec. 2019, 12 Pages.

Larsen-Ledet, et al., "Territorial Functioning in Collaborative Writing", In Proceedings of the 17th European Conference on Computer Supported Cooperative Work, vol. 28, Issue 3, Feb. 1, 2019, 52 Pages.

Liao, et al., "Status, identity, and language: A study of issue discussions in GitHub", In Journal of PLOS One, vol. 14, Issue 6, Jun. 14, 2019, 20 Pages.

Lima, et al., "Coding Together at Scale: GitHub as a Collaborative Social Network", In Repository of arXiv:1407.2535v1, Jul. 9, 2014, 10 Pages.

Longo, et al., "Use of GitHub as a Platform for Open Collaboration on Text Documents", In Proceedings of the 11th International Symposium on Open Collaboration, Aug. 19, 2015, 2 Pages.

Lowry, et al., "Building a Taxonomy and Nomenclature of Collaborative Writing to Improve Interdisciplinary Research and Practice", In the Journal of Business Communication, vol. 41, Issue 1, Jan. 2004, pp. 66-99.

Maiya, Aruns., "Ktrain: A Low-Code Library for Augmented Machine Learning", In Repository of arXiv:2004.10703v4, Jul. 31, 2020, pp. 1-9.

Maldeniya, et al., "Herding a Deluge of Good Samaritans: How GitHub Projects Respond to Increased Attention", In Proceedings of the Web Conference, Apr. 20, 2020, pp. 2055-2065.

Nguyen, et al., "Time-Position Characterization of Conflicts: A Case Study of Collaborative Editing", In International Conference on Collaboration Technologies and Social Computing, Sep. 8, 2020, 16 Pages.

Noel, et al., "Empirical Study on Collaborative Writing: What Do Co-authors Do, Use, and Like?", In Computer Supported Cooperative Work (CSCW), vol. 13, Issue 1, Mar. 2004, pp. 63-89.

Olson, et al., "How People Write Together Now: Beginning the Investigation with Advanced Undergraduates in a Project Course", In Journal of ACM Transactions on Computer-Human Interaction vol. 24, Issue 1., Mar. 6, 2017, 40 Pages.

Pe-Than, et al., "Collaborative Writing at Scale: A Case Study of Two Open-Text Projects Done on GitHub", In Collective Intelligence, Jun. 13, 2019, 4 Pages.

Pe-Than, et al., "Collaborative Writing on GitHub: A Case Study of a Book Project", In Companion of the 2018 ACM Conference on Computer Supported Cooperative Work and Social Computing, Nov. 3, 2018, pp. 305-308.

Ray, et al., "A large scale study of programming languages and code quality in github", In Proceedings of the 22nd ACM SIGSOFT International Symposium on Foundations of Software Engineering., Nov. 16, 2014, 11 Pages.

Recasens, et al., "Linguistic Models for Analyzing and Detecting Biased Language", In Proceedings of the 51st Annual Meeting of the Association for Computational Linguistics, vol. 1, Aug. 2013, pp. 1650-1659.

Ribeiro, et al., ""Why Should I Trust You?": Explaining the Predictions of Any Classifier", In Repository of arXiv:1602.04938v1, Feb. 16, 2016, 15 Pages.

Rimmershaw, Rachel, "Collaborative Writing Practices and Writing Support Technologies", In Journal of Instructional Science, vol. 21, Issue (1/3)., Jan. 1, 1992, pp. 15-28.

Risch, et al., "Top Comment or Flop Comment? Predicting and Explaining User Engagement in Online News Discussions", In Proceedings of the International AAAI Conference on Web and Social Media, May 26, 2020, pp. 579-589.

Romero, et al., "Coordination and Efficiency in Decentralized Collaboration", In Proceedings of the International AAAI Conference on Web and Social Media, vol. 9, No. 1, Apr. 21, 2015, pp. 367-376.

Sanh, et al., "DistilBERT, A Distilled Version of BERT: Smaller, Faster, Cheaper and Lighter", In Journal of Computing Research Repository, Mar. 1, 2020, 5 Pages.

Sarrafzadeh, et al., "Characterizing and Predicting Email Deferral Behavior", In Proceedings of the Twelfth ACM International Conference on Web Search and Data Mining, Feb. 11, 2019, pp. 627-635.

(56) References Cited

OTHER PUBLICATIONS

Sarrafzadeh, et al., "Characterizing stage-aware writing assistance for collaborative document authoring", In Proceedings of the ACM on Human-Computer Interaction, Jan. 5, 2021, 29 Pages.

Sarrafzadeh, et al., "Exploring Email Triage: Challenges and Opportunities", In Proceedings of the Conference on Human Information Interaction and Retrieval, Mar. 10, 2019, pp. 325-329.

Singer, et al., "Why We Read Wikipedia", In Journal of arXiv:1702.05379v2, Mar. 16, 2017, 10 Pages.

Teevan, et al., "Supporting Collaborative Writing with Microtasks", In Proceedings of the CHI Conference on Human Factors in Computing Systems, May 7, 2016, pp. 2657-2668.

Tomlinson, et al., "Massively distributed authorship of academic papers", In CHI '12 Extended Abstracts on Human Factors in Computing Systems, May 5, 2012, pp. 11-20.

Tsagkias, et al., "Predicting the volume of comments on online news stories", In Proceedings of the 18th ACM conference on Information and knowledge management, Nov. 2, 2009, pp. 1765-1768.

Tsay, et al., "Let's talk about it: Evaluating contributions through discussion in GitHub", In Proceedings of the 22nd ACM SIGSOFT International Symposium on Foundations of Software Engineering, Nov. 11, 2014, pp. 144-154.

Vasilescu, et al., "Quality and productivity outcomes relating to continuous integration in GitHub", In Proceedings of the 10th Joint Meeting on Foundations of Software Engineering, Aug. 30, 2015, pp. 805-816.

Wu, et al., "The appropriation of GitHub for curation", In PeerJ Computer Science, Oct. 9, 2017, pp. 1-20.

Wu, et al., "Understanding How GitHub Supports Curation Repositories", In Journal of Future Internet, Mar. 10, 2018, 15 Pages.

Yang, et al., "Who Did What: Editor Role Identification in Wikipedia", In Proceedings of the International AAAI Conference on Web and Social Media, Mar. 31, 2016, pp. 446-455.

Zhang, et al., "Characterizing Online Public Discussions through Patterns of Participant Interactions", In Proceedings of the ACM on Human-Computer Interaction, Nov. 2018, 27 Pages.

* cited by examiner

COLLABORATIVE COMMUNICATION TRIAGE ASSISTANCE

BACKGROUND

As writing moves online, collaborative writing activities are becoming increasingly prevalent. People collaborate over various projects, from encyclopedia articles to academic writings to general information-sharing documents. However, writing collaboratively is challenging. People often need to make sense of numerous edits, attend to a diverse range of writing tasks, and communicate with collaborators responsible for different aspects of the document. To effectively manage all these demands and ensure the smooth progression of the project, people need to make wise triage decisions.

The triage process has been explored in other settings, such as emails, where researchers have identified several key factors influencing human decisions. In examples, the amount of time or effort needed to attend to one or more emails may influence how and when such email is attended to. However, people are not known to be good at making such estimates accurately. For instance, it is observed that people often underestimate the time needed to complete a task even if they had past experience doing similar jobs, a tendency commonly known as the planning fallacy. Accordingly, systems to assist people in making better triage decisions to work together more effectively and produce higher-quality documents are needed.

SUMMARY

Aspects of the present disclosure are directed to using previously resolved conversation threads to move towards offering intelligent triage assistance in collaborative writing settings. In accordance with at least one example of the present disclosure, a system is described. The system may include one or more hardware processors configured by machine-readable instructions to: receive a conversation thread associated with collaboratively developed content, the conversation thread including a plurality of comments authored by multiple different authors; generate a predicted measure of completion for the received conversation thread, the predicted measure of completion being at least one of a predicted number of remaining actions until the received conversation thread is resolved or a predicted number of total actions for the conversation thread to be resolved; and provide, for display at a user interface, the predicted measure of completion for the received conversation thread, the predicted measure of completion being associated with the conversation thread at the user interface.

In accordance with at least one example of the present disclosure, a computer-readable storage medium comprising instructions being executable by one or more processors to perform a method is described. The method may include receiving at a machine learning model trained on a plurality of resolved conversation threads, a conversation thread associated with collaboratively developed content, wherein the conversation thread includes a plurality of comments authored by multiple different authors; generating a predicted measure of completion for the received conversation thread; and providing, for display at a user interface, the predicted measure of completion for the received conversation thread, the predicted measure of completion being associated with the conversation thread at the user interface.

In accordance with at least one example of the present disclosure, a method is described. The method may include receiving a plurality of conversation threads associated with collaboratively developed content, the plurality of conversation threads each include a plurality of comments authored by multiple different authors; for each conversation thread of the plurality of conversation threads, generating a predicted measure of completion for the respective conversation thread, the predicted measure of completion being at least one of a predicted number of remaining actions until the respective conversation thread is resolved or a predicted number of total actions for the respective conversation thread to be resolved; and providing, for display at a user interface, the plurality of conversation threads to be displayed at the user interface based on the respective predicted measure of completion for each conversation thread.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof and in which are shown by way of illustrations specific embodiments or examples. These aspects may be combined, other aspects may be utilized, and structural changes may be made without departing from the present disclosure. Examples may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Communication plays a key role in any collaboration. Most collaborative writing platforms or services provide space for communication where collaborators can discuss improvements to content and share discussions through comments and/or comment threads. GitHub, commonly known as a code collaboration platform, also contains various collaborative writing projects. In the context of GitHub projects, communication is supported through issues and pull requests, where collaborators may discuss specific projects and changes, as well as broader projects or team goals. As the project develops, many different conversation threads may emerge, which can be challenging to manage. People need to best allocate their attention to different threads that are at varying levels of priority and require different types of responses. To mitigate the problem, GitHub has introduced basic triage options for users to manage notifications, including those from conversations the user is involved in.

The quality of people's triage decisions may be limited by their ability to estimate relevant factors accurately. For instance, if one underestimates the time needed to draft a response, one may be forced to complete it in multiple tries with more context-switching or delay other important tasks. In the context of asynchronous communication, for which elapsed time can be rather noisy, examples described herein are provided that are directed to assessing which stage a conversation is at, where stage is measured by the number of turns elapsed out of the total number of turns needed to close the thread. By presenting this information to users, people may be able make more informed choices in allocating their attention among different conversations and communicate more effectively with their collaborators.

Figure 1:
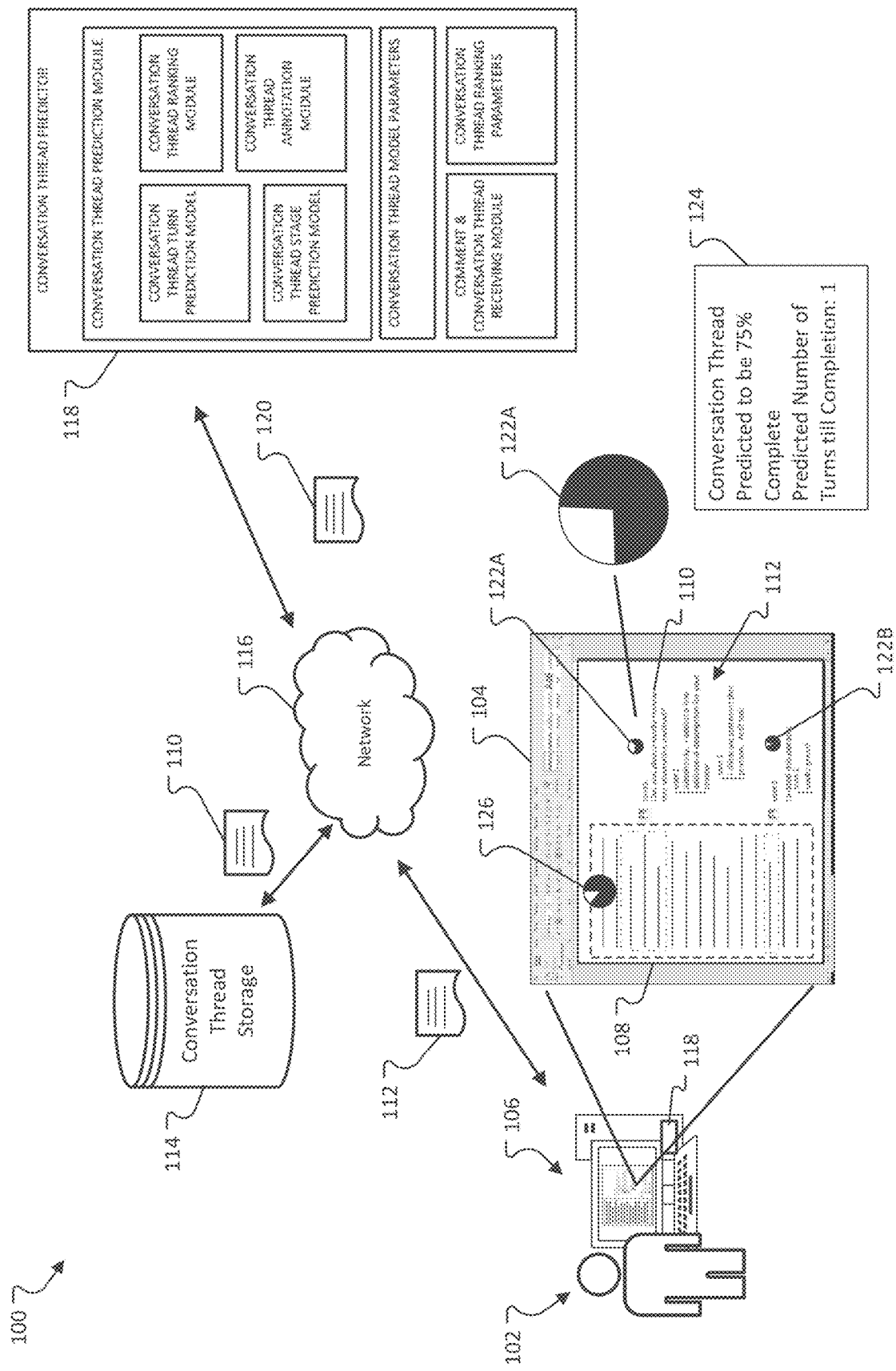
FIG. 1 depicts an example of a triage assistance and prioritization platform in accordance with examples of the present disclosure.

FIG. 1 depicts an example of a triage assistance and prioritization platform 100 in accordance with examples of the present disclosure. The triage assistance and prioritization platform 100 may utilize linguistic cues indicative of the progression of task-oriented conversations to drive a task to resolution. In examples, a user 102 may interact with a content creation application, where multiple authors collaborate on content and maintain multiple conversation threads related to the content. Example content creation applications include, but are not limited to productivity applications, coding tools (e.g., integrated development environments), and content stores. For example, a collaborative writing application may cause a user interface 104 to be displayed at a display device of a computing system 106, where the user interface 104 includes a document or source file that is collaboratively developed and/or collaboratively revised by a plurality of users. That is, one or more users may interact with content area 108 of a user interface 104 to add one or more comments 110 and/or reply to one or more comments 110. The one or more comments may be specific to a portion of text, such as a sentence, paragraph, or page. In some examples, the one or more comments 110 may be specific to a portion of source code. Further yet, the one or more comments 110 may be specific to a graphic, image, portion of sound, portion of video, etc., that a user may be collaboratively creating and/or editing with at least one other user. In examples, the one or more comments 110 are stored as a portion of the content, such as the document, source code, graphic, media etc. and may be stored as a conversation thread, where each comment in a conversation thread may be related to, branch from, or otherwise is associated with a top-level comment or first comment. Alternatively, or in addition, conversation threads 112 may be stored in in the comment storage 114 and may be provided to the comment storage 114 via the network 116. A conversation thread 112 may include one or more comments.

In accordance with examples of the present disclosure, the conversation thread 112 may be provided to a conversation thread predictor 118; the conversation thread predictor 118 may receive the conversation thread 112 and generate a prediction indicating how many total comments are likely to occur before the conversation thread 112 is closed or otherwise completed. As an example, based on a first comment received in the conversation thread 112, the conversation thread predictor 118 may predict that four total comments, or turns, are likely to occur before the issue or task raised in the first comment of the conversation thread 112 is completed. Alternatively, or in addition, the conversation thread predictor 118 may receive the conversation thread 112 and generate a prediction indicating how many additional comments are likely to occur before the conversation thread 112, or task associated with the conversation thread 112, is to be closed or otherwise completed. For example, based on one or more comments received in the conversation thread 112, the conversation thread predictor 118 may predict that four additional comments, or turns, are likely to occur before the issues or tasks raised in the first comment of the conversation thread 112 are completed. As another example, based on one or more comments received in the conversation thread 112, the conversation thread predictor 118 may predict that three additional comments, or turns, are likely to occur before the issues or tasks raised throughout the conversation thread 112 are completed. In some examples, the prediction of the additional comments that are likely to occur may be based on a total number of comments included in the thread and a predicted total number of comments needed to complete or close the conversation thread 112. In some examples, the conversation thread predictor 118 may receive the conversation thread 112 and generate a prediction indicating completeness of the conversation thread 112. For example, based on one or more comments received in the conversation thread 112, the conversation thread predictor 118 may predict that the comment thread is seventy-five percent complete.

Accordingly, the conversation thread predictor 118 can annotate a comment or conversation thread 112 and provide the annotated comment, or annotated conversation thread, as an annotation 120 to the comment storage 114 and/or to the user interface 104 associated with the collaborative writing application. Accordingly, the user interface 104 can display the annotation 120. The annotation 120 may be displayed in graphical form 122A/122B and/or may be displayed as textual information 124. In some examples, a cursor hovering over a comment 110 or conversation thread may cause the annotation 122A/122B and/or 124 to be displayed. As further depicted in FIG. 1, an annotation 122A/122B may be associated with each comment 110 or conversation thread. For example, the annotation 122A may be associated with a first comment or first conversation thread, while the annotation 122B may be associated with a second comment or second conversation thread. The annotations 122A/122B may provide a visual indication to a user, such as user 102, such that a user can immediately identify which conversation threads are closest to resolution and which will need more iterations/work. Thus, the annotations 122A/122B and/or 124 can help the user prioritize or triage what to work on based on their individual time constraints. That is, user 102 can triage conversation threads to select the optimal subtasks to maximize the situational constraints pertaining to the user. In examples, the annotations 122/122B and/or 124 and/or the conversation threads 112 may be sorted based on a predicted number of turns required and/or, in some instances, an estimated amount of effort required to complete a task. For example, a list of conversation threads may be generated and/or provided to the user, where the list of conversation threads is sorted according to one or more constraints provided by the user (e.g., "show me the conversation threads that are 95% complete.") In some examples, an annotation 126 may be provided, where the annotation 126 depicts predicted completeness of the content area 108, where the content area 108 may be a document, a page, a paragraph, etc.

Figure 2:
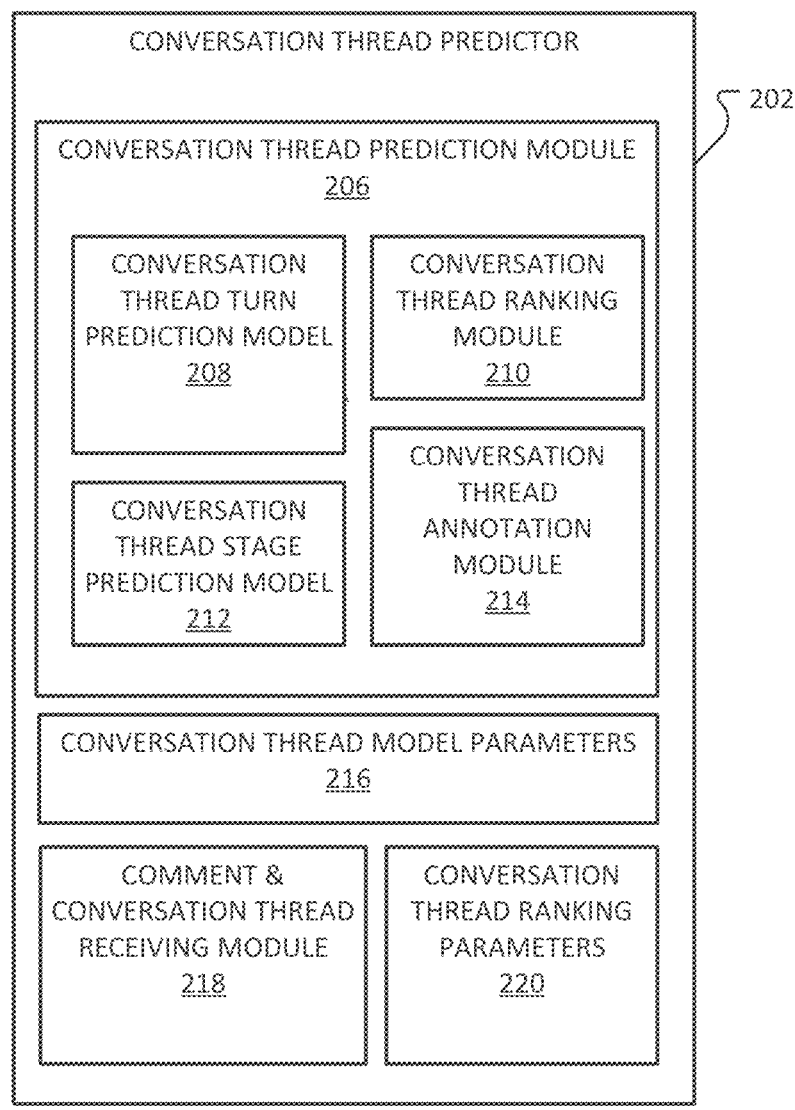
FIG. 2 depicts additional details of a conversation thread predictor in accordance with examples of the present disclosure.

FIG. 2 depicts additional details of a conversation thread predictor 204 in accordance with examples of the present disclosure. The conversation thread predictor 204 may be the same as or similar to the conversation thread predictor 118 (FIG. 1). The conversation thread predictor 204 may include a conversation thread prediction module 206, conversation thread model parameters 216, a comment and conversation thread receiving module 218, and conversation thread ranking parameters 220. The conversation thread prediction module 206 may include a conversation thread turn prediction model 208, a conversation thread ranking module 210, a conversation thread stage prediction model 212, and a conversation thread annotation module 214. The conversation thread turn prediction model 208 generates a predicted eventual number of turns, or eventual length, of a conversation thread for the conversation thread to be completed. For example, the conversation thread turn prediction model 208 may predict that a specific conversation thread, such as conversation thread 112 for example, may be completed after seven turns, where a turn is a measured response or comment by a user. In examples, what counts as a turn may be filtered or otherwise limited based on a length of the text in the turn or a number of words in the turn in order to filter out or otherwise consider textual replies that that may appear as an announcement or general comment.

In examples, the conversation thread turn prediction model 208 may be a machine learning model that receives, as input, one or more conversation thread features and a conversation thread via the comment and conversation thread receiving module 218. For example, the conversation thread turn prediction model 208 may be trained based on one or more datasets specific to a type of content that is collaboratively developed. That is, conversation threads for a word processing document may be different than conversation threads for source code development. As another example, conversation threads and comments may vary in specificity, availability of comment options for selection by a collaborator, and/or other information associated with a comment or comment thread based on a platform used by a collaborator. Accordingly, the conversation thread turn prediction model 208 may be specific to a type of content and platform from which the content originates. Therefore, the conversation thread model parameters 216 may be received at the conversation thread predictor 202 and may be used to tailor the conversation thread turn prediction model 208 to a specific type of content and/or platform from which comments and conversation threads originate.

The conversation thread stage prediction model 212 may predict the stage a conversation is at, where the stage is measured by the number of turns elapsed out of the total number of turns needed to close the thread. That is, the stage a conversation is at may be determined as follows: S=i/n where i is the current number of turns (e.g., number of comments in a conversation thread) and n is the predicted eventual length of the conversation thread. In some examples, $S=i/(i+n_f)$, where $n_f$ is the predicted number of future turns. Thus, if the conversation thread turn prediction model 208 predicts that fourteen comments, or turns, of comments are going to be required, the conversation thread stage prediction model 212 may determine that if four comments are included in the conversation thread, there would be approximately ten comments remaining and/or that the conversation thread is about twenty nine percent complete. As another example, the conversation thread stage prediction model 212 may predict that a comment thread has four turns remaining based on five turns included in the conversation thread; thus, the conversation thread turn prediction model 208 may determine that there would eventually be fourteen turns required to complete a conversation thread and that the current conversation thread is about fifty-five percent complete.

The conversation thread annotation module 214 may annotate or otherwise make the predicted stage information and/or a number of turns remaining information available at one or more of the conversation threads. For example, a pie chart (e.g., annotation 122A) may be displayed next to or otherwise in close proximity to the conversation thread 122. In some examples, the annotation may be displayed when a cursor hovers over a conversation thread. Alternatively, or in addition, annotation information, such as the textual information 124, may be provided, where such information related to a current stage, number of turns remaining, etc., may be displayed in a textual form.

In some examples, conversation thread ranking parameters 220 may be received at the conversation thread predictor 202. The conversation thread ranking parameters 220 are generally supplied by a user and may provide an indication as to how a user would like to see the conversation threads and/or annotations associated with the conversation threads. For example, a user may provide a ranking parameter indicating that the user would like to view conversation threads that are eighty percent complete or more. Accordingly, the conversation thread ranking module 210 may filter the conversation threads and/or annotations such that only those conversation threads and/or annotations that are predicted to be eighty percent complete or more are included in a user interface (e.g., user interface 104 of FIG. 1). As another example, a user parameter may indicate that the user desires to view those conversation threads that require more time to complete. In some examples, the conversation thread ranking parameters 220 may be automatically provided based on a user's calendar or other indication pertaining to an amount of time or effort available to a user. For example, if a user has a block of time to review a document, then the conversation thread ranking parameters 220 may indicate that the conversation thread ranking module 210 is to provide one or more conversation threads for a resolution to the user based on the amount of time available to the user. Thus, the comments and/or conversation threads displayed to a user may be provided to help a user prioritize or triage what to work on, based on their individual time constraints, thereby triaging conversation threads to select the optimal subtasks to maximize the situational constraints pertaining to the user.

Figure 3:
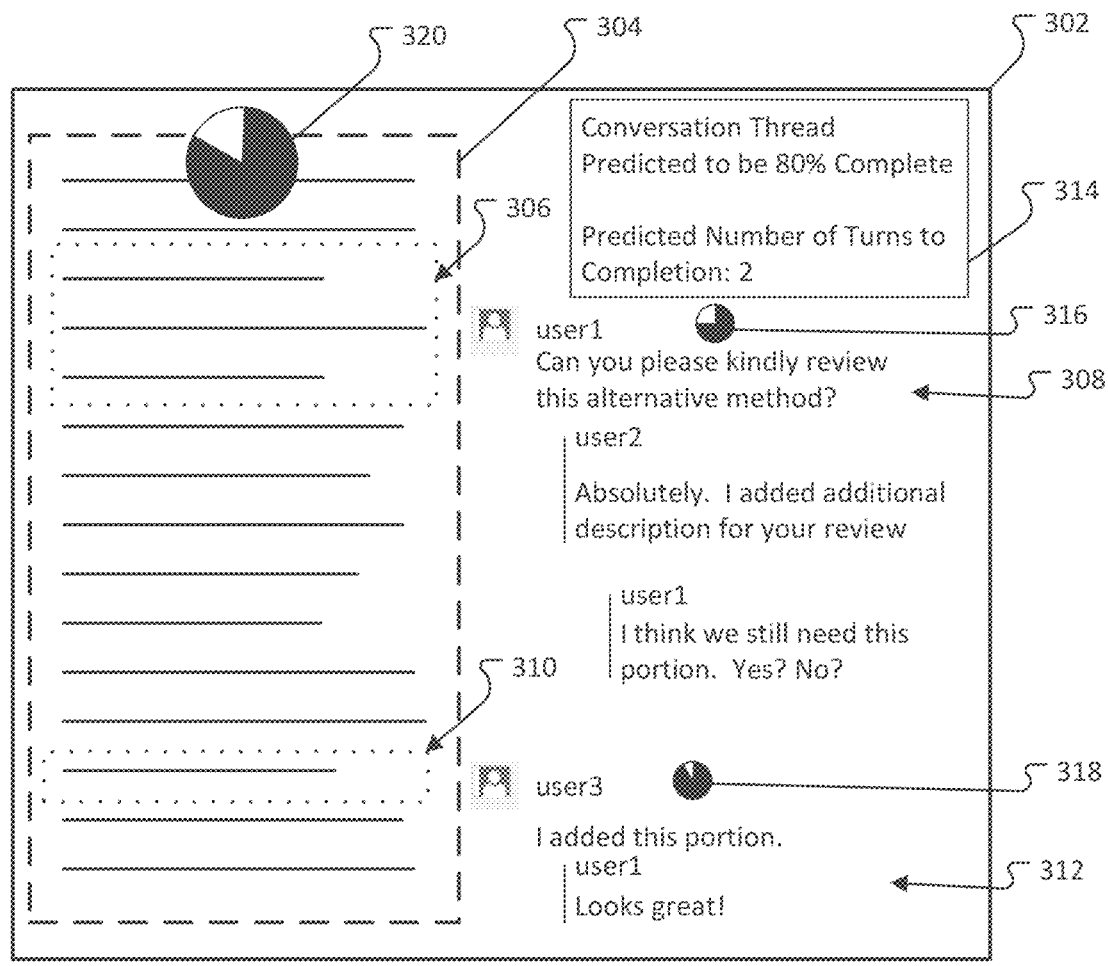
FIG. 3 depicts an example user interface in accordance with examples of the present disclosure.

FIG. 3 depicts an example user interface 302 in accordance with examples of the present disclosure. The user interface 302 may be the same as or similar to the user interface 104 (FIG. 1) previously described. The user interface 302 may include a content area 304 to which one or more comments are directed. In examples, a plurality of comment in the conversation thread 308 may be directed to or otherwise associated with a portion 306 of the content area 304. In addition to predicting a number of turns remaining and/or a current stage of a conversation thread based on the comments included in a conversation thread, the conversation thread predictor 202 for example, may further predict the number of turns remaining and/or a current stage of the conversation thread based on the portion 306 of the content area 304 associated with the conversation thread. For example, one or more comments may be directed to a portion 306 of the content area 304 that includes grammatically incorrect or stylistically incorrect text. Thus, the conversation thread predictor 202, for example, may receive the conversation thread 308 and the portion 306 of the content area 304, and base a predicted number of turns on the grammatically incorrect or stylistically incorrect text in addition to the comments in the conversation thread. As another example, one or more comments may be directed to a portion 306 of the content area 304 including factual information, such as dates, times, and/or events. The conversation thread predictor 202 may receive the conversation thread 308 and the portion 306 of the content area 304, and base a predicted number of turns on the factual information in portion 306 in addition to the comments in the conversation thread. In some instances, factual information may be more likely to be resolved in a fewer number of turns than conversation threads directed to larger portions of the content area 304, organizational and/or layout modifications, and/or other portions of content that may require a larger amount of modifications.

As further depicted in FIG. 3, a comment thread 312 may be associated with a portion 310; the conversation thread predictor 202 may receive the comment thread 312 in addition to the portion 310 and predict a number of turns remaining and/or a current stage. In some examples, one or more keywords included in the comment thread, for example comment thread 312, may indicate that a conversation thread is nearing completion. For example, a comment that includes "looks great" may be more likely to be associated with a comment nearing completion than a comment directed to "I added additional description for your review." In addition, the relation or position of one comment to another comment may be more indicative of how complete a conversation thread is.

As previously discussed, an annotation providing information about the predicted stage and/or number of stages remaining may be provided at the user interface 302. For example, the conversation thread annotation module 214 may provide an annotation 316 and/or 318 that graphically indicates how near or how far a conversation thread is from completion. As another example, textual information 314 may also be provided at the user interface 302. The textual information 314 may display more specific information in addition to the information provided by the annotation 316 and/or 318 for example. In some instances, an annotation 320 may provide an overall predicted document completion based on the conversation threads associated with the content area 304. For example, the annotation 320 may indicate a predicted number of turns remaining based on the predicted number of turns remaining at each of the conversation threads, for example conversation threads 308 and/or 312. In other examples, the annotation 320 may be provided as a prediction from the conversation thread predictor 202 and may be different from the remaining total number of turns as predicted by the conversation thread predictor 202.

Figure 4:
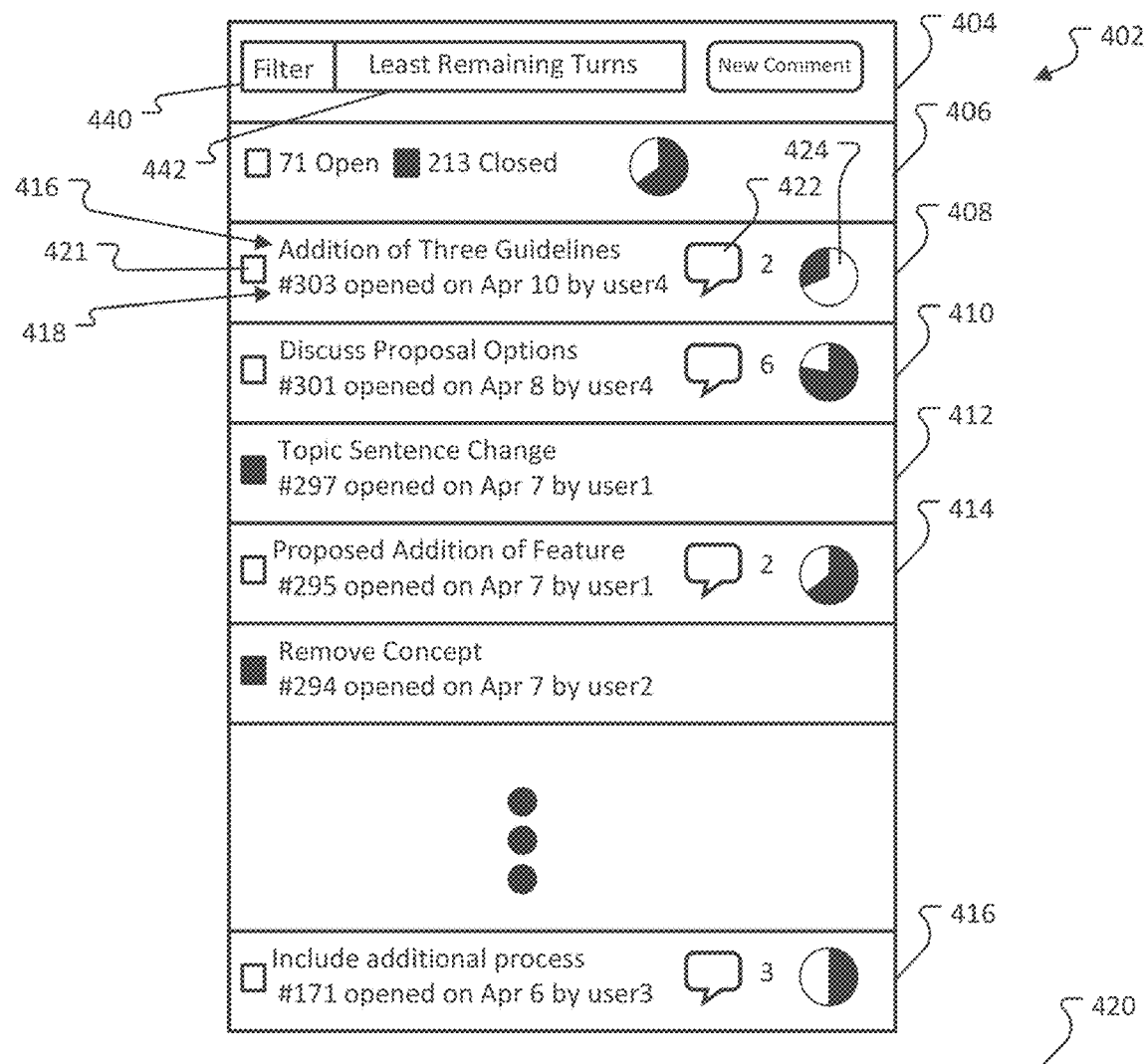
FIG. 4 depicts example user interfaces in accordance with examples of the present disclosure.
Figure 4:
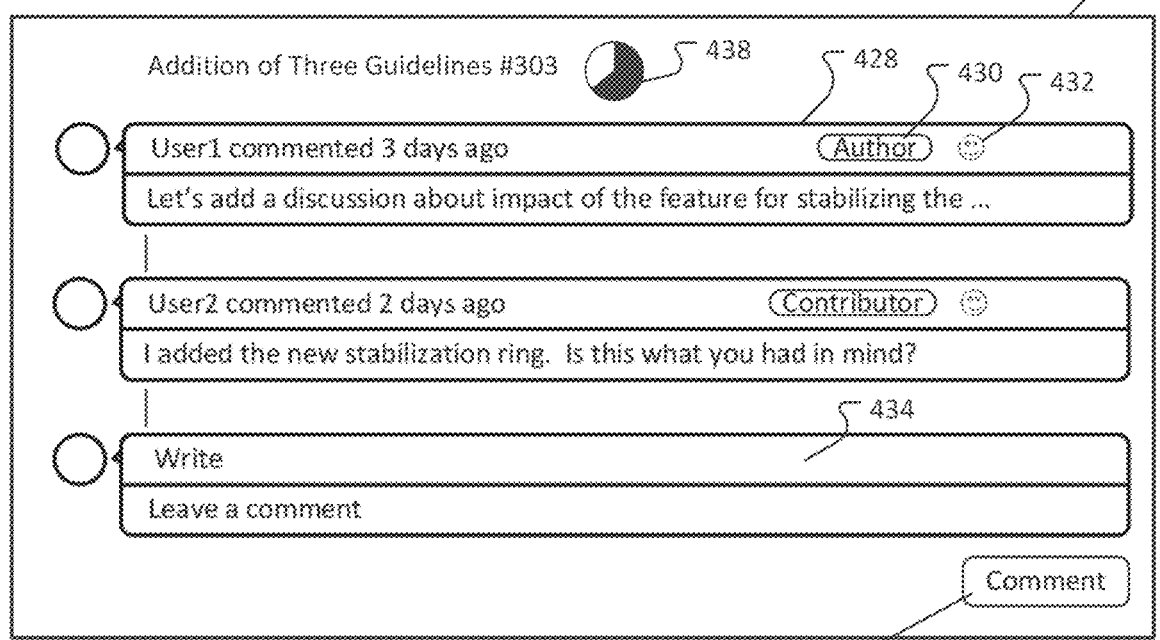

FIG. 4 depicts example user interfaces 402 and 420 in accordance with examples of the present disclosure. The user interface 402 may be the same as or similar to the user interface 104 (FIG. 1) previously described. In examples, the user interface 402 may display a plurality of conversation threads in a list form or other arrangement. For example, one or more conversation threads 410, 412, 414 . . . 416 may be associated with a collaboratively authored document, such as source code. Such conversation threads 410, 412, 414 . . . . 416 may be displayed in a summary view in the user interface 402. As an example, the conversation thread 408 may display a title 416 of a conversation thread, additional information 418 of the conversation thread pertaining to when the conversation thread was opened, which user opened the conversation thread, and in some instances a unique identifier, such as a number, associated with the conversation thread. The conversation thread 408 may also include a status indication 421 indicating whether the conversation thread is still open or closed. In addition, the conversation thread 408, may indicate a number of comments 422 included in the conversation.

In accordance with examples of the present disclosure, the conversation thread 408 may include an annotation 424 indicating stage and/or turn information. For example, the annotation 424 may graphically indicate a predicted number of turns remaining and/or a predicted stage or percentage complete. The user interface 420 depicts additional details directed to the conversation thread 408. The user interface 420 may display additional information, such as each comment e.g., comment 428, in the conversation thread, additional information of the comment such as but not limited to an author 430 and social information 432 indicating opinion information for example from a plurality of users. The user interface 420 may provide area 434 for a user to create an additional comment and/or post the comment using control 436. In accordance with examples of the present disclosure, the user interface 420 may display the annotation 438, which may be the same as or similar to the annotation 424 previously described.

The user interface 402 may further provide summary information 406, indicating how many comments are open and how many are closed. Further, a filter or ranking interface including a filter mechanism 440 and filter detail portion 442 may be included in the user interface 420. The filter mechanism 440 may allow a user to apply or remove a filter that sorts or otherwise causes the conversation threads in the user interface 402 to be displayed according to the filter detail portion 442. Accordingly, a user may desire to have the conversation threads that are predicted to have the least amount of remaining turns be displayed first. As another example, a user may desire to view those conversation threads predicted to require the least amount of effort until closure be displayed first, where effort may be derived from the number of turns remaining and a predicted complexity of the conversation thread. In some examples, a user may select to display conversation threads having a single comment and further predicted to need one additional comment until closure. Of course, additional sorting of the conversation threads is contemplated herein.

Figure 5:
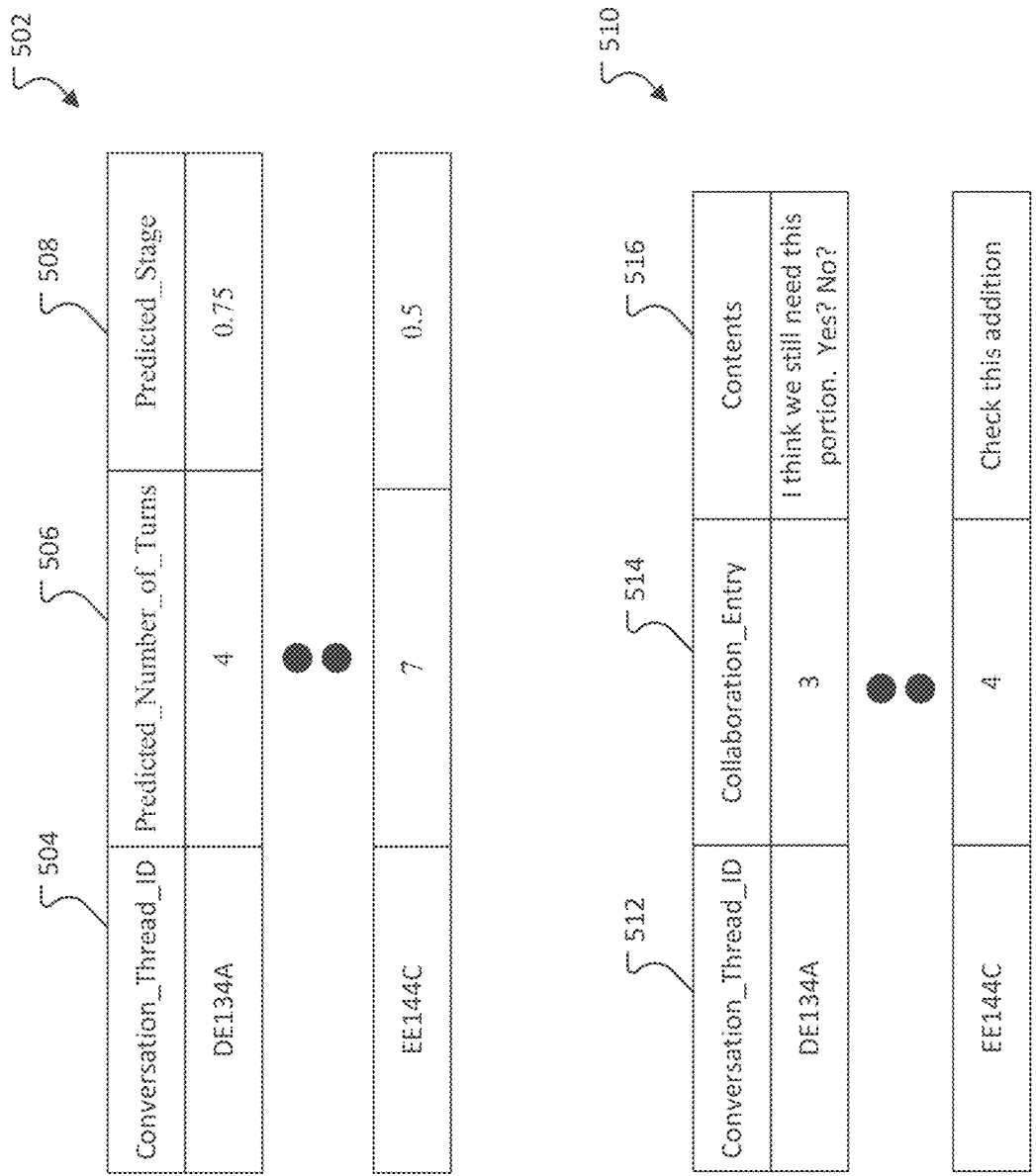
FIG. 5 depicts example data structures in accordance with examples of the present disclosure.

FIG. 5 depicts example data structures 502 and 510 in accordance with examples of the present disclosure. The example data structure 502 may include a conversation thread identifier field 504 which may uniquely identify a conversation thread within content or at content, such as but not limited to a document, source code file, or presentation. The data structure 502 may include a predicted number of turns field 506 indicating a predicted number of turns that remain for the conversation thread identified by the conversation thread identifier field 504. In some examples, a predicted stage field 508 may indicate a current predicted stage based on the number of comments included in the conversation thread and/or the number of comments or turns predicted to remain. The data structure 510 may include details of each conversation thread. For example, a conversation thread identifier field may uniquely identify a conversation thread; additional information associated with the conversation thread may include a number of the entry or comment entry (e.g., a first entry, a second entry . . . ), and the contents of such entry 516. In examples, one or more portions of the data structure 510 may be provided to the conversation thread predictor 202 as conversation thread 112.

Figure 6:
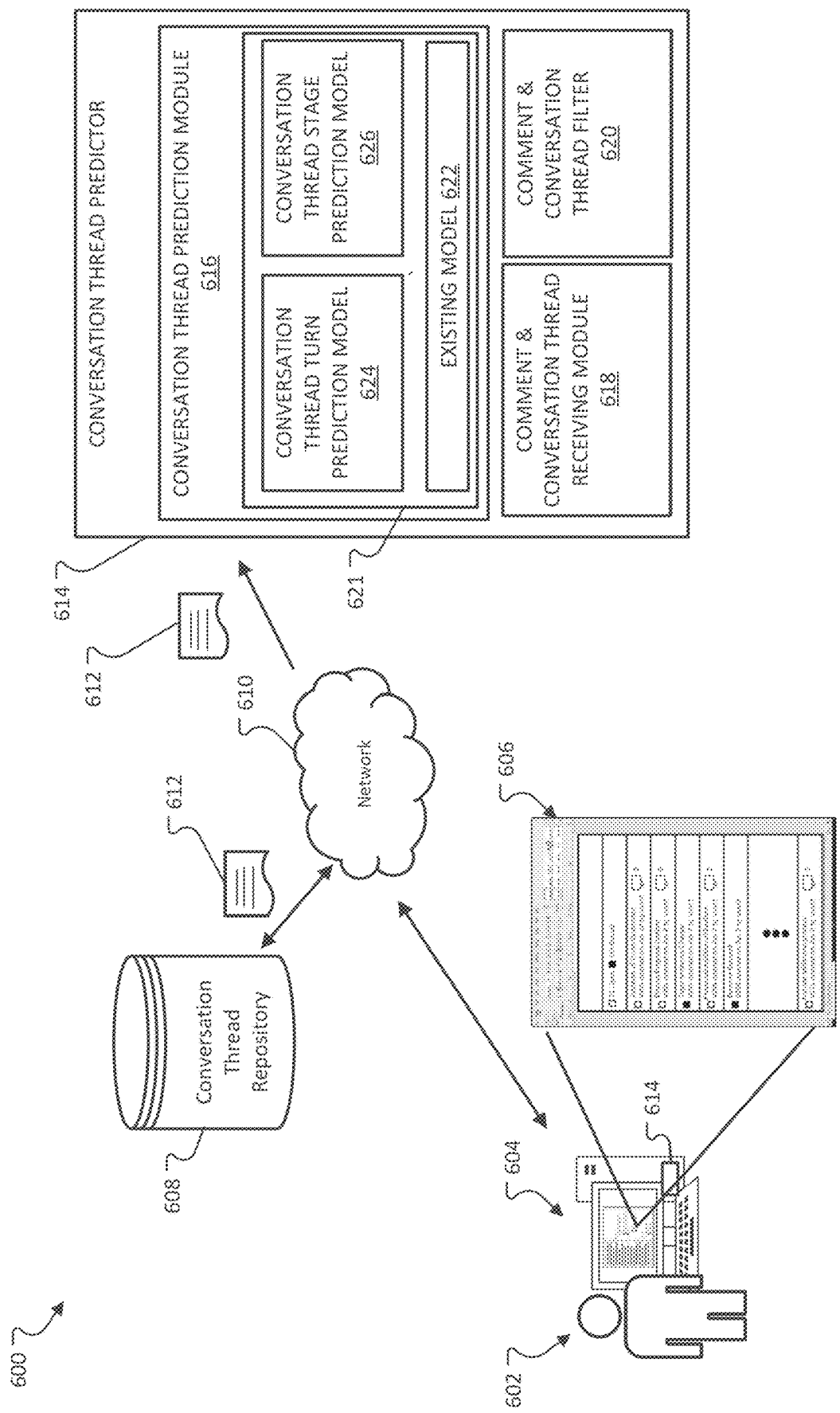
FIG. 6 depicts details directed to training a model of a triage assistance and prioritization platform in accordance with examples of the present disclosure.

FIG. 6 depicts details directed to training a model of a triage assistance and prioritization platform 600 in accordance with examples of the present disclosure. In examples, a user 602 may use a computing system 604 to identify one or more conversation threads residing in a conversation thread repository 608. The conversation thread repository may include a plurality of conversation threads specific to a type of content and/or platform as previously mentioned. In examples, a user interface 606 may display examples of the conversation threads for a user 602 to review. The user 602 may direct a conversation thread predictor 614 to ingest example conversation threads 612 provided from the conversation thread repository 608 via the network 610. In examples, the comment and conversation thread receiving module 618 may receive the conversation threads and provide the conversation threads to the comment and conversation thread filter 620. The comment and conversation thread filter 620 may sort or filter the conversation threads received at the comment and conversation thread receiving module 618 based on language, the nature of the comments in a conversation thread, the number collaborators in a conversation thread, whether the conversation threads are closed or still open, and in some instances, based on content type. For example, source code conversation threads may be used to train one or more models of the conversation thread predictor for source code-related collaboratively authored projects, whereas word processing conversation threads may be used to train one or more models of the conversation thread predictor for collaboratively authored word processing documents.

The conversation thread predictor 614 may then provide the filtered conversation threads to a model 621. Feature that may be sued to represent conversation threads include, but are not limited to lexicalized features (word and character ngrams), semantic vector representations provided by pre-trained language models, and other "contextual" features that may be available, such as but not limited to information about the authors of the comments in the conversation thread, the time of day/day of the week when the comments in the comment thread were made, etc.) In examples, the model 621 may include one or more existing and trained models 622 together with one or more models specific to predicting conversation turns. That is, the model 622 may be a model trained in an unsupervised manner, while the models 624 and/or 626 may be trained in a supervised manner based on the filtered conversation threads. For example, the models 624 and/or 626 is trained on a set of existing completed comment threads. Each comment in the thread can be used as a training instance, where the supervision (label) is the known stage of completion that the comment represents (e.g. it is the $5^{th}$ out of ten comments, so its label is "50%"). In examples, the existing model 622 may be a transformer-based, RNN-based, or other type of model. The models 624 and/or 626 may then fine-tune the existing model 622 based on the filtered conversation threads as described above. In other examples, one or more other techniques for transferring learning from one machine learning model to another machine learning model may be used to update or fine tune the existing model 622. Of course, the model 621 may be trained from scratch based on the filtered conversation threads. Once trained, the model 621 may be readied for use with the conversation thread prediction module 616 of the conversation thread predictor 614. That is, when trained, the model 621 may be the same as or similar to the prediction model 208 and/or the conversation thread annotation module 214 of FIG. 2.

Figure 7:
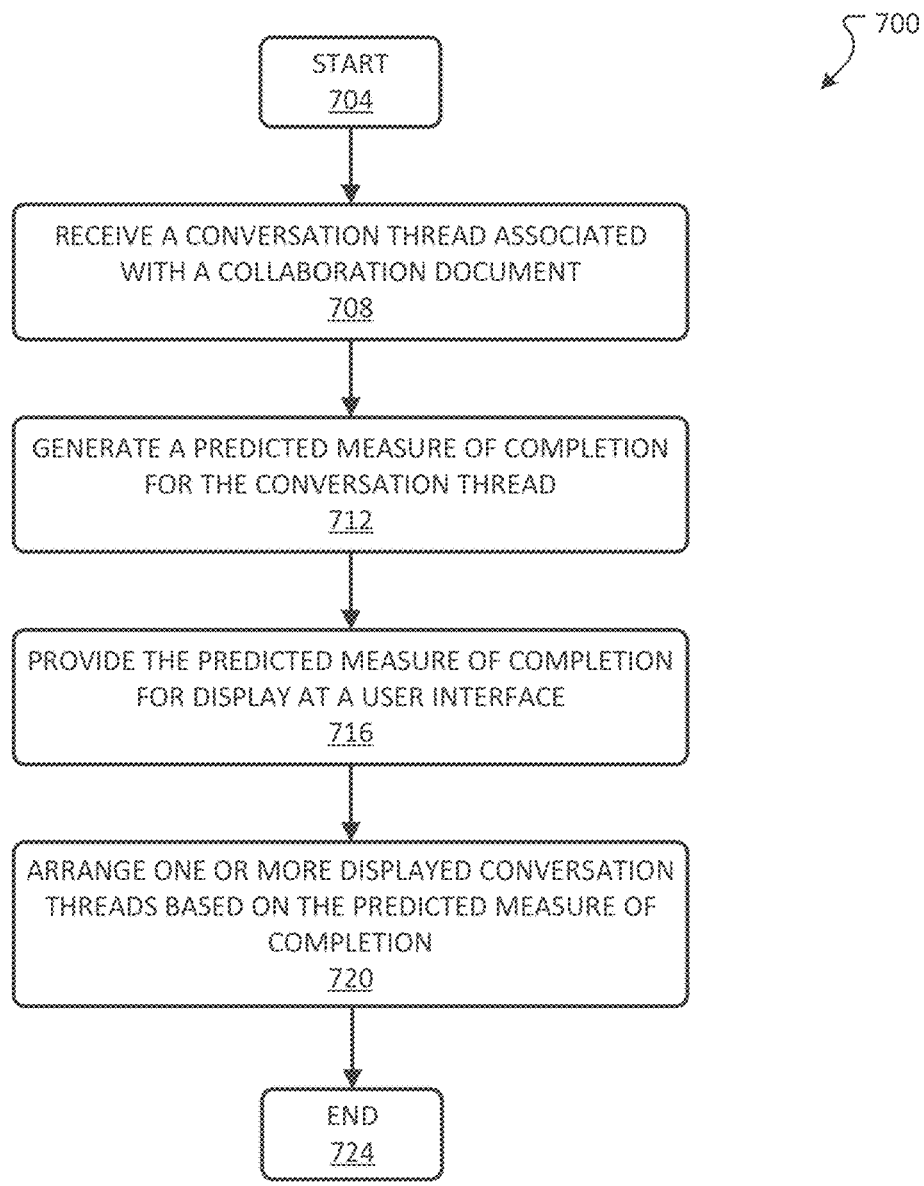
FIG. 7 depicts an example method for providing information for user prioritization of tasks associated with collaboratively developed content in accordance with examples of the present disclosure.

FIG. 7 depicts an example method 700 for providing information for user prioritization of tasks associated with collaboratively developed content in accordance with examples of the present disclosure. A general order for the steps of the method 700 is shown in FIG. 7. Generally, the method 700 starts at 702 and ends at 732. The method 700 may include more or fewer steps or may arrange the order of the steps differently than those shown in FIG. 7. The method 700 can be executed as a set of computer-executable instructions executed by a computer system and encoded or stored on a computer-readable medium. Further, the method 700 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 700 shall be explained with reference to the systems, components, modules, software, data structures, user interfaces, etc. described in conjunction with FIGS. 1-6.

The method 700 begins at operation 704 and proceeds to 708, where a conversation thread associated with a collaboration document is received. The conversation thread may correspond to a comment thread, a pull request, or some other group of a plurality of comments related to content. The method 700 may proceed to operation 712, where a predicted measure of completion for the conversation thread may be generated. In examples, the measure of completion for the conversation thread may be equal to the stage or the number of remaining terms specific to the conversation thread. Accordingly, the method 700 may proceed to operation 716, where information associated with the predicted measure of completion may be provided to a display at a user interface. For example, the predicted measure of completion may correspond to an annotation that is specific to a conversation thread. Therefore, the annotation may be displayed at the user interface. In some examples, the annotation may be presented as a graphic or other image. Alternatively, or in addition, the annotation may include text information.

In accordance with examples of the present disclosure, one or more displayed conversation threads may be arranged or rearranged based on the predicted measure of completion associated with the received conversation thread at 708. For example, conversation threads may be displayed in a list format where conversation threads having a measure of completion that is greater than a value or other threshold number may be displayed earlier than conversation threads having measures of completion that are less than the value or other threshold number. Accordingly, a user having limited amount of time or other constraints may easily view those conversation threads nearest to completion. The method may end at 724.

Figure 8:
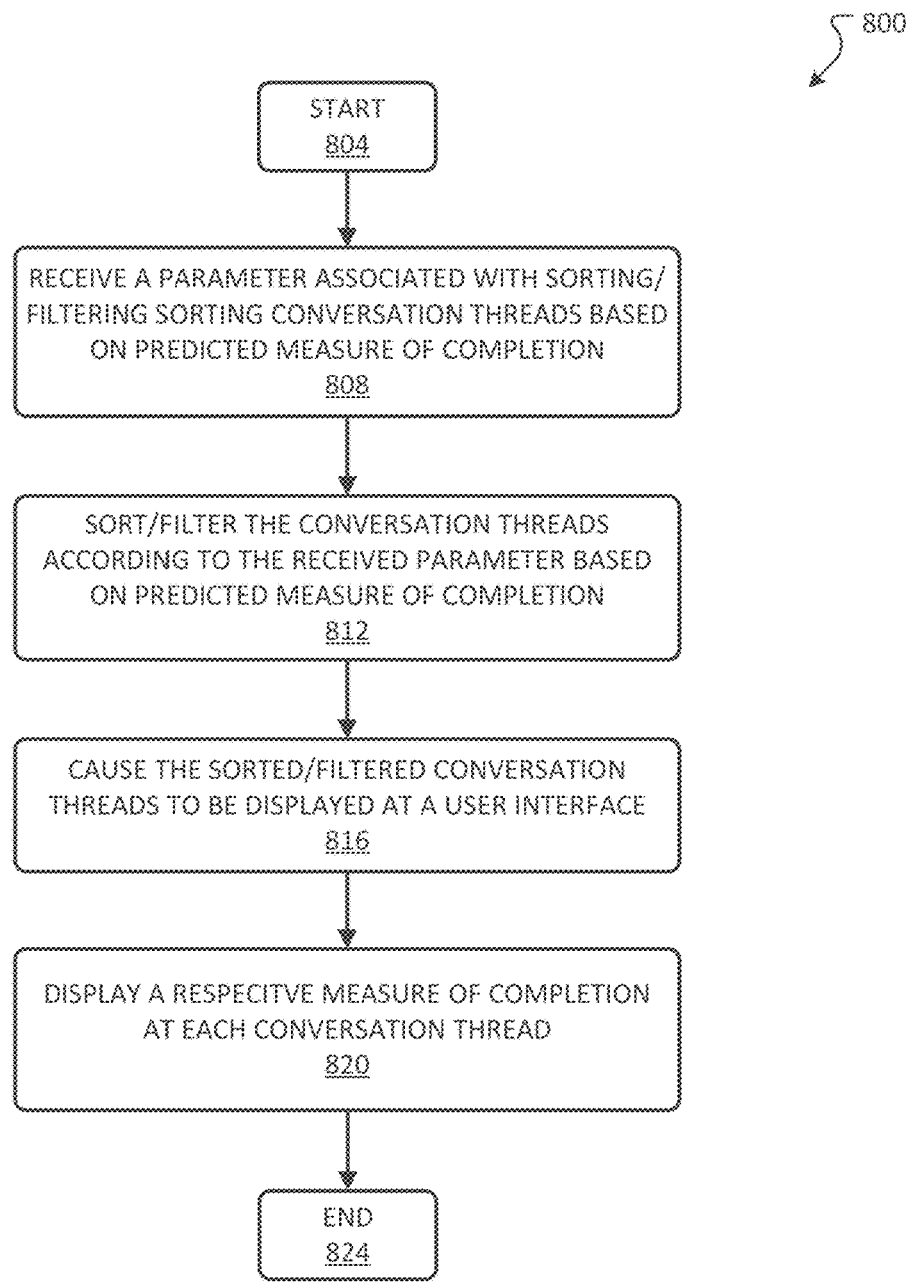
FIG. 8 depicts an example method for providing information for user prioritization of tasks associated with collaboratively developed content in accordance with examples of the present disclosure.

FIG. 8 depicts an example method 800 for presenting comment threads in accordance with examples of the present disclosure. A general order for the steps of the method 800 is shown in FIG. 8. Generally, the method 800 starts at 804 and ends at 824. The method 800 may include more or fewer steps or may arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 800 shall be explained with reference to the systems, components, modules, software, data structures, user interfaces, etc. described in conjunction with FIGS. 1-7.

The method 800 begins at operation 804 and proceeds to 808 where one or more parameters associated with sorting and/or filtering a display of conversation threads is received. The one or more parameters may be received at a control of a user interface. Alternatively, or in addition, the one or more parameters may be derived from one or more external locations such a but not limited to a user's calendar, tracked habits of the user, or timeline associated with the content (e.g., approaching deadline). In examples, the method 800 may proceed to 812. At 812, conversation threads may then be filtered and/or sorted based on the received one or more parameters. For example, conversation threads requiring more than two turns or less than 75% complete may be filtered such that those conversation threads meeting these criteria are not displayed at a user interface. As another example, conversation threads nearing completion (e.g., nearing 90% complete) and including a username may be displayed whereas all other conversation threads may be hidden from the view of the user. In some examples, the conversation threads may be sorted according to a predicted measure of completion, such as the predicted number of turns until completion, the current stage, etc. The method 800 may proceed to 816, where the sorted and/or filtered conversation threads are then displayed at a user interface. For example, a sorted list of conversation threads may be presented to the user, where the sorted list is includes less than all of the conversation threads in the content or document. The method 800 may then proceed to 820, such that the displayed conversation threads are displayed together with the measure of completion. For example, a graphical element or textual element may be displayed in close proximity to a conversation thread such that a user, or collaborator, can easily determine how far along the conversation thread is and whether the current user's constraints would permit the user to address the particular conversation thread. The method 800 may then end at 824.

Figure 9:
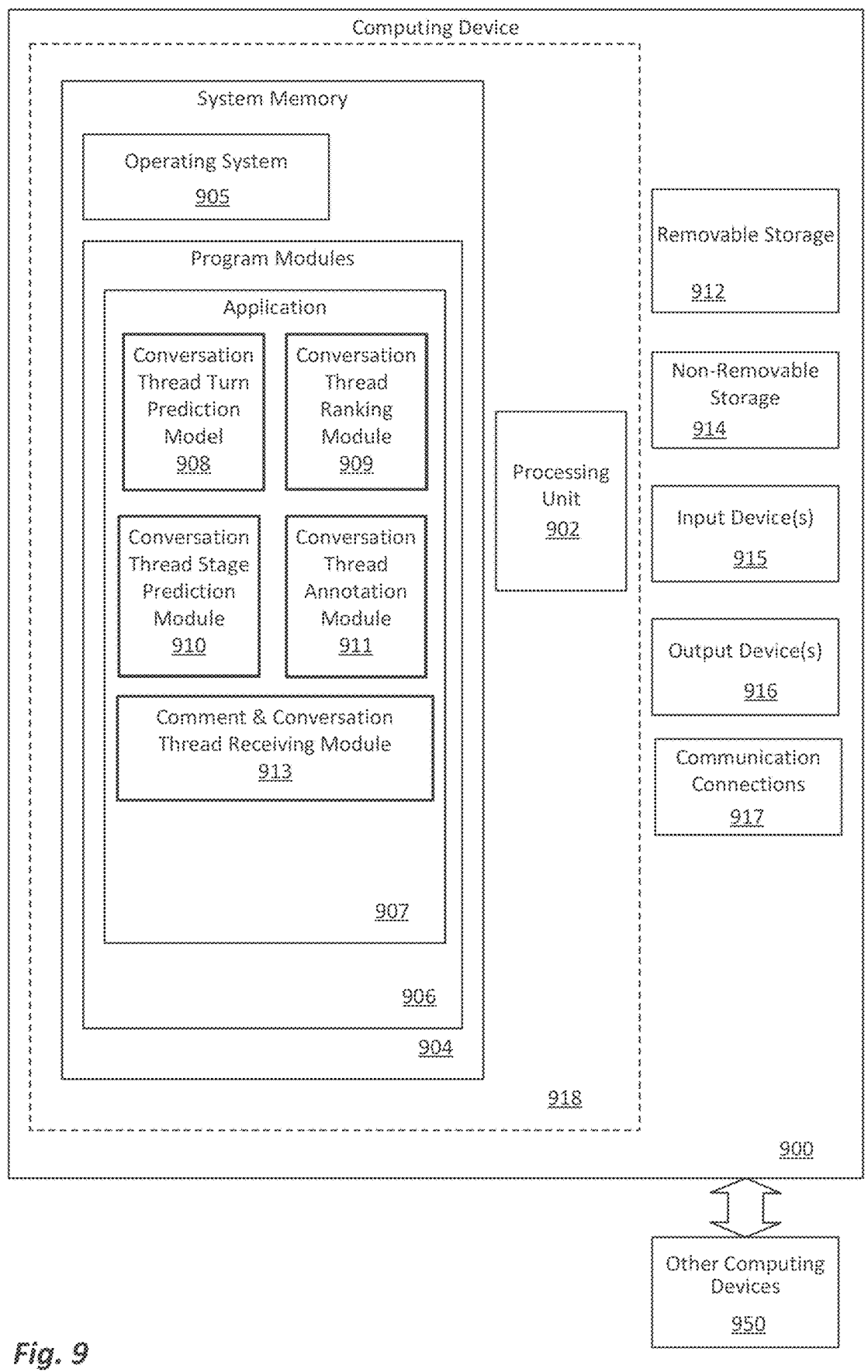
FIG. 9 is a block diagram illustrating physical components (e.g., hardware) of a computing device with which aspects of the disclosure may be practiced.
Figure 10A:
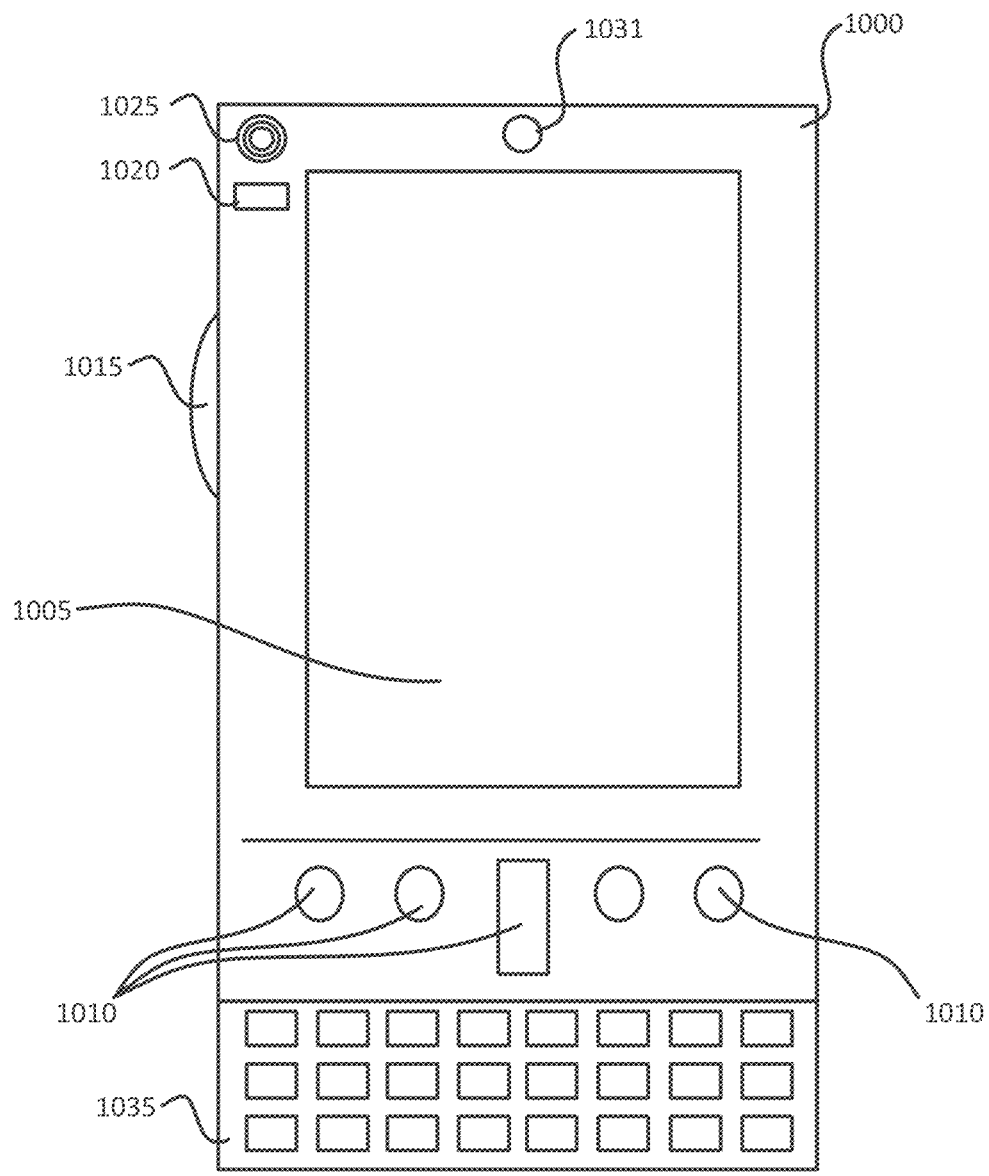
FIGS. 10A-10B illustrate a mobile computing device with which embodiments of the disclosure may be practiced.
Figure 10B:
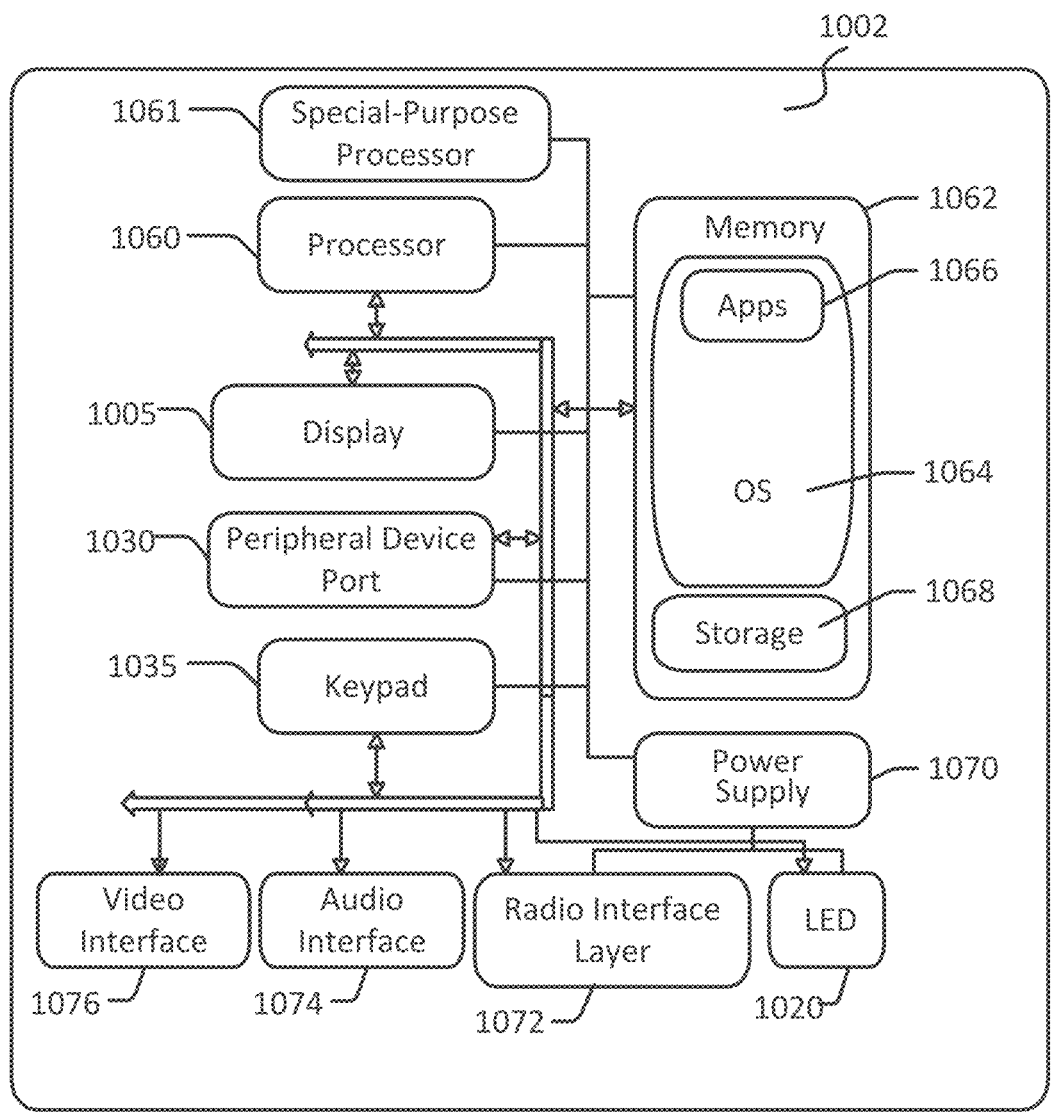
Figure 11:
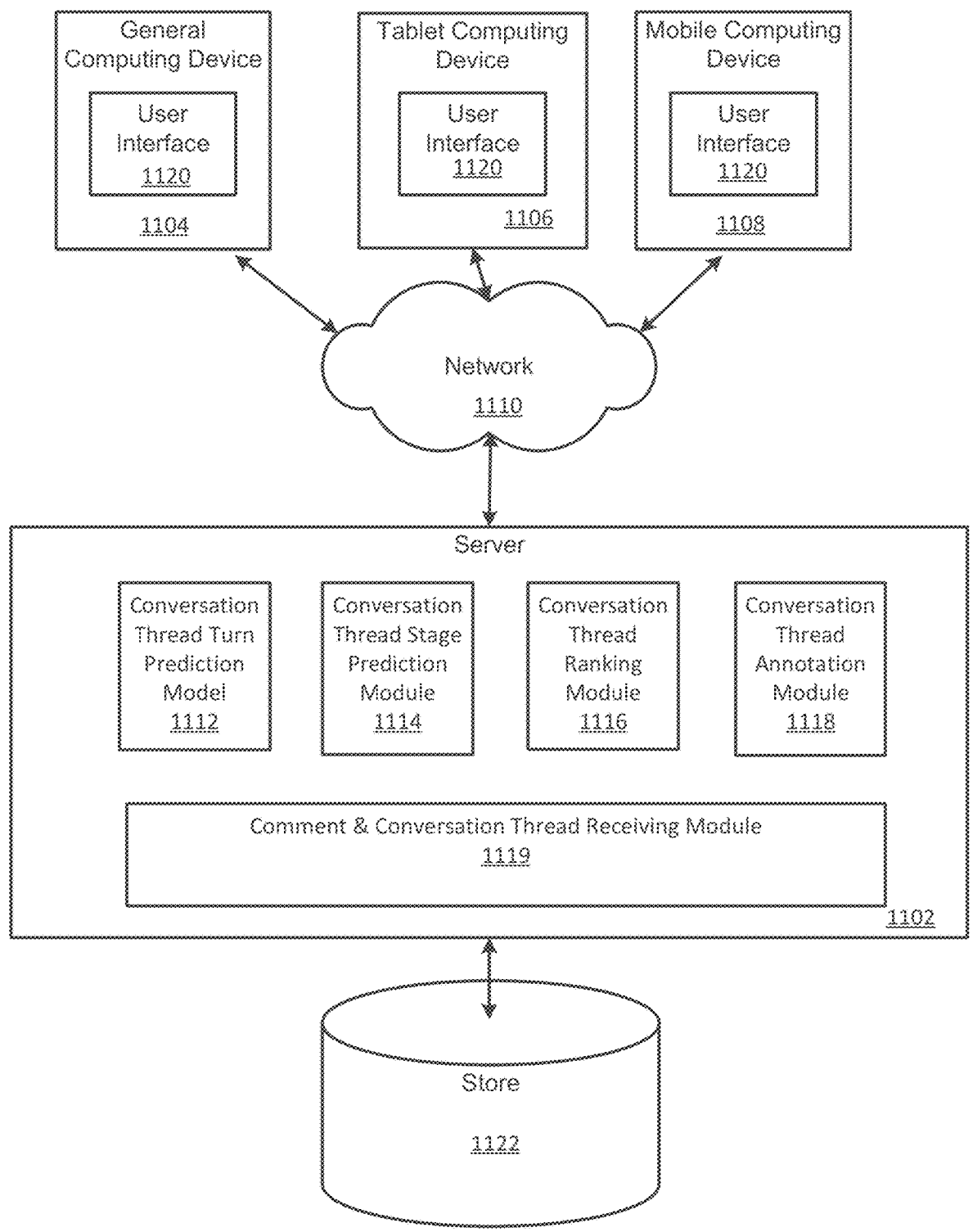
FIG. 11 illustrates one aspect of the architecture of a system for processing data.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of computing device configurations that may be utilized for practicing aspects of the disclosure, described herein.

FIG. 9 is a block diagram illustrating physical components (e.g., hardware) of a computing system 900 with which aspects of the disclosure may be practiced. The computing device components described below may be suitable for the computing and/or processing devices described above. In a basic configuration, the computing system 900 may include at least one processing unit 902 and a system memory 904. Depending on the configuration and type of computing device, the system memory 904 may comprise, but is not limited to, volatile storage (e.g., random-access memory (RAM)), non-volatile storage (e.g., read-only memory (ROM)), flash memory, or any combination of such memories.

The system memory 904 may include an operating system 905 and one or more program modules 906 suitable for running software application 907, such as one or more components supported by the systems described herein. As examples, system memory 904 may include the conversation thread turn prediction model 908, the conversation thread stage prediction module 910, the conversation thread ranking module 909, the conversation thread annotation module 911, and the comment and conversation thread receiving module 913. The conversation thread turn prediction model 908 may be the same as or similar to the conversation thread turn prediction model 208 (FIG. 2), the conversation thread stage prediction module 910 may be the same as or similar to the conversation thread stage prediction model 212 (FIG. 2), the conversation thread ranking module 909 may be the same as or similar to the conversation thread ranking module 210 (FIG. 2), the conversation thread annotation module 911 may be the same as or similar to the conversation thread annotation module 214 (FIG. 2), and the comment and conversation thread receiving module 913 may be the same as or similar to the comment and conversation thread receiving module 218 (FIG. 2). The operating system 905, for example, may be suitable for controlling the operation of the computing system 900.

Furthermore, embodiments of the disclosure may be practiced in conjunction with a graphics library, other operating systems, or any other application program and is not limited to any particular application or system. This basic configuration is illustrated in FIG. 9 by those components within a dashed line 918. The computing system 900 may have additional features or functionality. For example, the computing system 900 may also include additional data storage devices (removable and/or non-removable) such as, for example, magnetic disks, optical disks, or tape. Such additional storage is illustrated in FIG. 9 by a removable storage device 912 and a non-removable storage device 914.

As stated above, a number of program modules and data files may be stored in the system memory 904. While executing on the processing unit 902, the program modules 906 (e.g., application 907) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic element, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 900 may also have one or more input device(s) 915 such as a keyboard, a mouse, a pen, a sound or voice input device, a touch or swipe input device, etc. The output device(s) 916 such as a display, speakers, a printer, etc. may also be included. The aforementioned devices are examples and others may be used. The computing system 900 may include one or more communication connections 917 allowing communications with other computing devices 950. Examples of suitable communication connections 917 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and non-volatile, removable, and non-removable media implemented in any method or technology for storage of information, such as computer readable instructions, data structures, or program modules. The system memory 904, the removable storage device 912, and the non-removable storage device 914 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing system 900. Any such computer storage media may be part of the computing system 900. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A-10B illustrate a mobile computing device 1000, for example, a mobile telephone, a smartphone, wearable computer (such as a smartwatch), a tablet computer, a laptop computer, and the like, with which embodiments of the disclosure may be practiced. In some respects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display).

If included, an optional side input element 1015 allows further user input. The side input element 1015 may be a rotary switch, a button, or any other type of manual input element. In alternative aspects, mobile computing device 1000 may incorporate greater or fewer input elements. For example, the display 1005 may not be a touch screen in some embodiments.

In yet another alternative example, the mobile computing device 1000 is a portable phone system, such as a cellular phone. The mobile computing device 1000 may also include an optional keypad 1035. Optional keypad 1035 may be a physical keypad or a "soft" keypad generated on the touch screen display.

In various examples, the output elements include the display 1005 for showing a graphical user interface (GUI), a visual indicator 1020 (e.g., a light-emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, email, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, email programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as email or other messages used by an email application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light-emitting diode (LED), and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an onboard camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

FIG. 11 illustrates one aspect of the architecture of a system for processing data received at a computing system from a remote source, such as a personal computer 1104, tablet computing device 1106, or mobile computing device 1108, as described above. The personal computer 1104, tablet computing device 1106, or mobile computing device 1108 may include a user interface 1120 allowing a user to interact with one or more program modules as previously described. One or more of the previously described program modules 906 or software applications 907 may be employed by server device 1102 and/or the personal computer 1104, tablet computing device 1106, or mobile computing device 1108, as described above. For example, the server device 1102, and in many examples the personal computer 1104, tablet computing device 1106, and/or mobile computing device 1108 may include a conversation thread turn prediction model 1112, the conversation thread stage prediction module 1114, the conversation thread ranking module 1116, the conversation thread annotation module 1118, and the comment and conversation thread receiving module 1119. The conversation thread turn prediction model 1112 may be the same as or similar to the conversation thread turn prediction model 208 (FIG. 2), the conversation thread stage prediction module 1114 may be the same as or similar to the conversation thread stage prediction model 212 (FIG. 2), the conversation thread ranking module 1116 may be the same as or similar to the conversation thread ranking module 210 (FIG. 2), the conversation thread annotation module 1118 may be the same as or similar to the conversation thread annotation module 214 (FIG. 2), and the comment and conversation thread receiving module 1119 may be the same as or similar to the comment and conversation thread receiving module 218 (FIG. 2).

The server device 1102 may provide data to and from a client computing device such as a personal computer 1104, a tablet computing device 1106 and/or a mobile computing device 1108 (e.g., a smartphone) through a network 1110. By way of example, the computer system described above may be embodied in a personal computer 1104, a tablet computing device 1106 and/or a mobile computing device 1108 (e.g., a smartphone). Any of these examples of the computing devices may obtain content from the store 1122, in addition to receiving graphical data useable to be either pre-processed at a graphic-originating system, or post-processed at a receiving computing system. The store 1122 may also include the document & content repository 1124, which may be the same as or similar to the document & content repository 248 previously described.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via onboard computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure relates to systems and methods for providing intelligent triage assistance in collaborative authoring settings according to at least the examples provided in the sections below:

(A1) In one aspect, some examples include a method comprising: receiving a conversation thread associated with collaboratively developed content, the conversation thread including a plurality of comments authored by multiple different authors; generating a predicted measure of completion for the received conversation thread, the predicted measure of completion being at least one of a predicted number of remaining actions until the received conversation thread is resolved or a predicted number of total actions for the conversation thread to be resolved; and providing, for display at a user interface, the predicted measure of completion for the received conversation thread, the predicted measure of completion being associated with the conversation thread at the user interface.

(A2) In some examples of A1, the method further includes receiving a plurality of conversation threads associated with the collaboratively developed content, the plurality of conversation threads each including a plurality of comments authored by multiple different authors; for each conversation thread of the plurality of conversation threads, generating a predicted measure of completion for the respective conversation thread; and causing the plurality of conversation threads to be displayed at the user interface based on the respective predicted measure of completion for respective conversation threads.

(A3) In some examples of A1-A2, the plurality of conversation threads is displayed as being sorted according to a user indicated selection associated with the predicted measure of completion for each conversation thread.

(A4) In some examples of A1-A3, the method further includes generating a predicted measure of completion associated with the collaboratively developed content, the predicted measure of completion being based on the plurality of conversation threads.

(A5) In some examples of A1-A4, the collaboratively developed content is at least one of source code, text of a word processing document, or slides of a presentation document.

(A6) In some examples of A1-A5, the conversation thread associated with the collaboratively developed content is received at a machine learning model trained on a plurality of resolved conversation threads.

(A7) In some examples of A1-A6, the predicted measure of completion is displayed at the user interface in a graphical form.

(A8) In some examples of A1-A7, the method further includes selecting a comment thread from a plurality of comment threads based on the predicted measure of completion; and provide, for display at the user interface, the selected comment thread as a recommend comment thread for completion by a user.

(A9) In some examples of A1-A8, the predicted number of total actions for the conversation thread to be resolved is a predicted number of total comments to resolve the conversation thread.

In yet another aspect, some examples include a system including one or more processors and memory coupled to the one or more processors, the memory storing one or more instructions which when executed by the one or more processors, causes the one or more processors to perform any of the methods described herein (e.g., A1-A9 described above).

In yet another aspect, some examples include a computer-readable storage medium storing one or more programs for execution by one or more processors of a device, the one or more programs including instructions for performing any of the methods described herein (e.g., A1-A9 described above).

(B1) In one aspect, some examples include a method comprising receiving a plurality of conversation threads associated with collaboratively developed content, the plurality of conversation threads each include a plurality of comments authored by multiple different authors; for each conversation thread of the plurality of conversation threads, generating a predicted measure of completion for the respective conversation thread, the predicted measure of completion being at least one of a predicted number of remaining actions until the respective conversation thread is resolved or a predicted number of total actions for the respective conversation thread to be resolved; and providing, for display at a user interface, the plurality of conversation threads to be displayed at the user interface based on the respective predicted measure of completion for each conversation thread.

(B2) In some examples of B1, the plurality of conversation threads is sorted according to a user indicated selection associated with the predicted measure of completion for each conversation thread.

(B3) In some examples of B1-B2, the method further includes generating a predicted measure of completion associated with the collaboratively developed content, the predicted measure of completion being based on the plurality of conversation threads.

(B4) In some examples of B1-B3, the collaboratively developed content is at least one of source code, text of a word processing document, or slides of a presentation document.

(B5) In some examples of B1-B4, the plurality of conversation threads associated with the collaboratively developed content are received at a machine learning model trained on a plurality of resolved conversation threads.

(B6) In some examples of B1-B5, the predicted number of remaining actions until the respective conversation thread is resolved is a predicted number of comments to be added to the respective conversation thread until the respective conversation thread is resolved.

(B7) In some examples of B1-B6, the predicted number of total actions for the respective conversation thread to be resolved is a predicted number of total comments to resolve the respective conversation thread.

In yet another aspect, some examples include a system including one or more processors and memory coupled to the one or more processors, the memory storing one or more instructions which when executed by the one or more processors, causes the one or more processors to perform any of the methods described herein (e.g., B1-B7 described above).

In yet another aspect, some examples include a computer-readable storage medium storing one or more programs for execution by one or more processors of a device, the one or more programs including instructions for performing any of the methods described herein (e.g., B1-B7 described above).

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
   one or more hardware processors configured by machine-readable instructions to:
   receive a conversation thread associated with collaboratively developed content, the conversation thread including a plurality of comments authored by multiple different authors;
   generate a predicted measure of completion for the received conversation thread, the predicted measure of completion being at least one of a predicted number of remaining actions until the received conversation thread is resolved or a predicted number of total actions for the conversation thread to be resolved;
   provide, for display at a user interface, the predicted measure of completion for the received conversation thread, the predicted measure of completion being associated with the conversation thread at the user interface, and an annotation of the predicted measures of completion that is different from a remaining total number of turns as predicted;
   select a comment thread from a plurality of comment threads based on the predicted measure of completion; and
   provide, for display at the user interface, the selected comment thread as a recommend comment thread for completion by a user.

2. The system of claim 1, wherein the one or more hardware processors are further configured by machine-readable instructions to:
   receive a plurality of conversation threads associated with the collaboratively developed content, the plurality of conversation threads each including a plurality of comments authored by multiple different authors;
   for each conversation thread of the plurality of conversation threads, generate a predicted measure of completion for the respective conversation thread, and
   cause the plurality of conversation threads to be displayed at the user interface based on the respective predicted measure of completion for respective conversation threads.

3. The system of claim 2, wherein the plurality of conversation threads is displayed as being sorted according to a user indicated selection associated with the predicted measure of completion for each conversation thread.

4. The system of claim 2, wherein the one or more hardware processors are further configured by machine-readable instructions to: generate a predicted measure of completion associated with the collaboratively developed content, the predicted measure of completion being based on the plurality of conversation threads.

5. The system of claim 1, wherein the collaboratively developed content is at least one of source code, text of a word processing document, or slides of a presentation document.

6. The system of claim 1, wherein the conversation thread associated with the collaboratively developed content is received at a machine learning model trained on a plurality of resolved conversation threads.

7. The system of claim 1, wherein the predicted measure of completion is displayed at the user interface in a graphical form.

8. The system of claim 1, wherein the predicted number of total actions for the conversation thread to be resolved is a predicted number of total comments to resolve the conversation thread.

9. The system of claim 1, wherein the conversation thread is rearranged based on the predicted measurements of completion associated with the received conversation thread.

10. A computer-readable storage medium comprising instructions being executable by one or more processors to perform a method, the method comprising:
    receiving at a machine learning model trained on a plurality of resolved conversation threads, a conversation thread associated with collaboratively developed content, wherein the conversation thread includes a plurality of comments authored by multiple different authors;
    generating a predicted measure of completion for the received conversation thread;
    providing, for display at a user interface, the predicted measure of completion for the received conversation thread, the predicted measure of completion being associated with the conversation thread at the user interface, and an annotation of the predicted measures of completion that is different from a remaining total number of turns as predicted;
    selecting, by machine-readable instructions, a comment thread from a plurality of comment threads based on the predicted measure of completion; and
    providing for display at the user interface, the selected comment thread as a recommend comment thread for completion by a user.

11. The computer-readable storage medium of claim 10, wherein the instructions cause the one or more processors to:
    receive a plurality of conversation threads associated with the collaboratively developed content, the plurality of conversation threads each including a plurality of comments authored by multiple different authors;
    for each conversation thread of the plurality of conversation threads, generate a predicted measure of completion for the respective conversation thread; and
    cause the plurality of conversation threads to be displayed at the user interface based on the respective predicted measure of completion for each conversation thread.

12. The computer-readable storage medium of claim 11, wherein the plurality of conversation threads is sorted according to a user indicated selection associated with the predicted measure of completion for each conversation thread.

13. The computer-readable storage medium of claim 10, wherein the collaboratively developed content is at least one of source code, text of a word processing document, or slides of a presentation document.

14. A method, comprising:
    receiving a plurality of conversation threads associated with collaboratively developed content, the plurality of conversation threads each include a plurality of comments authored by multiple different authors;
    for each conversation thread of the plurality of conversation threads, generating a predicted measure of completion for the respective conversation thread, the predicted measure of completion being at least one of a predicted number of remaining actions until the respective conversation thread is resolved or a predicted number of total actions for the respective conversation thread to be resolved;

providing, for display at a user interface, the plurality of conversation threads to be displayed at the user interface based on the respective predicted measure of completion for each conversation thread, and an annotation of the respective predicted measures of completion that is different from a remaining total number of turns as predicted;

selecting, by machine-readable instructions, a comment thread from a plurality of comment threads based on the predicted measure of completion; and providing for display at the user interface, the selected comment thread as a recommend comment thread for completion by a user.

15. The method of claim 14, wherein the plurality of conversation threads is sorted according to a user indicated selection associated with the predicted measure of completion for each conversation thread.

16. The method of claim 15, further comprising generating a predicted measure of completion associated with the collaboratively developed content, the predicted measure of completion being based on the plurality of conversation threads.

17. The method of claim 14, wherein the collaboratively developed content is at least one of source code, text of a word processing document, or slides of a presentation document.

18. The method of claim 14, wherein the plurality of conversation threads associated with the collaboratively developed content are received at a machine learning model trained on a plurality of resolved conversation threads.

19. The method of claim 14, wherein the predicted number of remaining actions until the respective conversation thread is resolved is a predicted number of comments to be added to the respective conversation thread until the respective conversation thread is resolved.

20. The method of claim 14, wherein the predicted number of total actions for the respective conversation thread to be resolved is a predicted number of total comments to resolve the respective conversation thread.

\* \* \* \* \*